United States Patent

Lennen

[11] Patent Number: 5,757,677
[45] Date of Patent: *May 26, 1998

[54] COMPENSATION FOR DIFFERENCES IN RECEIVER SIGNALS AND IN SATELLITE SIGNALS

[75] Inventor: Gary R. Lennen, Cupertino, Calif.

[73] Assignee: Trimble Navigation Limited, Sunnyvale, Calif.

[*] Notice: The term of this patent shall not extend beyond the expiration date of Pat. No. 5,526,291.

[21] Appl. No.: 658,938

[22] Filed: May 31, 1996

Related U.S. Application Data

[63] Continuation of Ser. No. 302,592, Sep. 8, 1994, Pat. No. 5,526,291.

[51] Int. Cl.⁶ .................... G01C 21/00; G06G 7/19
[52] U.S. Cl. ..................... 364/571.02; 364/449.8; 364/576; 342/358; 342/402; 375/320; 375/243
[58] Field of Search ...................... 364/571.02, 516, 364/424.01, 526, 572–575, 449.8; 375/220, 243; 342/358, 402

[56] References Cited

U.S. PATENT DOCUMENTS

| | | | |
|---|---|---|---|
| 3,778,830 | 12/1973 | Joseph | 343/17.7 |
| 4,302,666 | 11/1981 | Hawkins | 235/404 |
| 4,345,206 | 8/1982 | Skalka | 324/76.44 |
| 4,463,357 | 7/1984 | MacDoran | 342/460 |
| 4,498,052 | 2/1985 | Fothergill | 330/149 |
| 4,615,014 | 9/1986 | Gigandet et al. | 364/557 |
| 4,827,488 | 5/1989 | Shibano | 375/328 |
| 5,148,179 | 9/1992 | Allison | 342/357 |
| 5,206,500 | 4/1993 | Decker et al. | 250/214 R |
| 5,220,509 | 6/1993 | Takemura et al. | 364/449.95 |
| 5,253,045 | 10/1993 | Lippel | 348/606 |
| 5,258,753 | 11/1993 | Jonker et al. | 345/140 |
| 5,291,284 | 3/1994 | Carr et al. | 348/415 |
| 5,339,246 | 8/1994 | Kao | 364/457 |
| 5,345,245 | 9/1994 | Ishikawa et al. | 342/357 |
| 5,373,298 | 12/1994 | Karouby | 342/357 |
| 5,450,448 | 9/1995 | Sheynblat | 375/346 |

OTHER PUBLICATIONS

GPS Interface Control Document ICD–GPS–200, Rockwell International Corp., Satellite Systems Div., Rev. B–PR, Jul. 3, 1991.

Tom Logston, *The NAVSTAR Global Positioning System*, Van Nostrand Reinhold, New York, 1992.

*Global Positioning System*, Tom Logsdon, op. cit., pp. 17–90.

*Primary Examiner*—Emanuel T. Voeltz
*Assistant Examiner*—Hien Vo
*Attorney, Agent, or Firm*—John Schipper

[57] ABSTRACT

Method and apparatus for compensating for the differences in time varying signals $S(t;R;S)$ received and processed by two signal receivers ($R_2$ and $R_3$), located at the same site, from two signal sources ($S_2$ and $S_3$) that are spaced apart from the receivers. A receiver ($R_1$) is chosen as a baseline, and two double difference signals $DD(t;R_1;R_2;S_2;S_3)=S(t;R_1;S_2)-S(t;R_1;S_3)-S(t;R_2;S_2)+S(t;R_2;S_3)$ and $DD(t;R_1;R_3;S_2;S_3)=S(t;R_1;S_2)-S(t;R_1;S_3)-S(t;R_3;S_2)+S(t;R_3;S_3)$ are formed. Time averages of these two double difference signals are formed, using a time interval of length T lying in a preferred range, and are subtracted from the corresponding double difference signals to form first and second compensated signals. A time varying third compensated signal, equal to the difference of the first and second compensated signals, is formed that compensates for the differences in signals that are contemporaneously received from the signal sources $S_2$ and $S_3$ at the receivers $R_2$ and $R_3$ located at the same site. This compensated signal has the property that its time varying value, when averaged over a time interval of length T, has a magnitude that is either zero or is less than a small positive threshold value. This compensation approach extends to receipt of more than one kind of coded signal, such as P code or C/A code in the presence of or absence of anti-spoofing, each of which is processed differently by a receiver/processor. This compensation can be used for any type of receiver/processor and is useful in compensation for receiver/processors used in Satellite Positioning Systems, such as GPS and GLONASS.

19 Claims, 6 Drawing Sheets

COMPENSATION FOR DIFFERENCES IN RECEIVER SIGNALS AND IN SATELLITE SIGNALS

This application is a continuation of Ser. No. 302,592, Sep. 8, 1994, U.S. Pat. No. 5,526,291.

FIELD OF THE INVENTION

This invention is related to receipt and processing of electrical communication signals, and more particularly to receipt and analysis of such signals from satellites in a Satellite Positioning System.

BACKGROUND OF THE INVENTION

A satellite signal is usually intended to be received and processed by a plurality of receiver/processors, and the electronic components and/or processing paths of these receiver/processors may differ substantially from each other, even where the receiver/processors are produced by a single manufacturer. Each receiver/processor will filter an incoming signal as part of the signal processing, and the electrical parameters (impedances, capacitances, inductances, active component values) of the circuit that produces the filtered signal in one receiver/processor will differ from the corresponding electrical parameters in another receiver/processor. If the incoming signal is characterized with a known and fixed frequency spectrum, the resulting filtered signal for any two receiver/processors will differ from each other. Further, the output signal spectra produced by transmitters in two satellites may also differ from each other, because the two satellites are manufactured differently or because the two transmitters' component values differ.

An important example of these differences occurs in processing of Global Positioning System (GPS) signals received at one or more GPS signal antennas from two or more GPS satellites. Each GPS antenna is connected to one or more GPS signal receiver/processors that receive the satellite signals and determine the pseudorange, or length of time required for a satellite signal to propagate from the satellite to antenna. A GPS signal, transmitted by a single GPS satellite and received and processed at two equivalent GPS receiver/processors, will produce two slightly different receiver/processor output signals. The same GPS signal, transmitted from each of two GPS satellites and received and processed at a single GPS receiver/processor, will produce two slightly different receiver/processor output signals.

Further, input signals received from two GPS satellites may differ qualitatively from each other because one satellite signal contains P-code and the other satellite signal is either a C/A code signal or is processed using cross-correlation analysis or another suitable processing technique. In such an instance, the two input signals are processed differently by a given receiver/processor and produce different output signals.

Two consequences of these differences are that: (1) the output signals produced by two receiver/processors, located at the same site, from an input signal received from a single satellite, will differ from each other; and (2) the output signals produced by a single receiver/processor from input signals received from two satellites may differ from each other. Ideally, two receiver/processors, located at the same site and receiving identical input signals from any satellite, should produce identical corresponding filtered output signals no matter which satellite transmitted the signals.

Workers in other fields have occasionally confronted persistent, time-dependent signal errors and have devised various approaches for reducing the effects of these errors on the system of interest. Hawkins, in U.S. Pat. No. 4,302,666, discloses determination of the effect of aiming errors in a rocket launcher, which includes coarse aiming and fine tune aiming, by computing a time average of the magnitude and the direction of the aiming errors. The rocket launcher is re-aimed after each launch, based on the perceived errors.

In U.S. Pat. No. 4,345,206, Skalka discloses formation of a difference between a machine-counted value, such as number of oscillator pulses, and the "true" value over a selected time interval to determine an average count error. The time interval length used for comparison is varied according to the count difference.

A time averaging, signal detection circuit that increases the signal-to-noise ratio (SNR) of a received signal is disclosed by Fothergill in U.S. Pat. No. 4,498,052. A received signal is fed to a first operational amplifier, then through a transformer, and the transformer output signal is partly subtracted from the op amp input signal. The op amp output signal has an enhanced d.c. and improved SNR.

Gigandet et al disclose a cooking oven system that computes and displays the average baking time of some food article only if the magnitude of the difference between the average baking time and a reference baking time is at least equal to a selected threshold, in U.S. Pat. No. 4,615,014. This difference is used to control speed of a conveyor belt that carries food articles through the oven.

A demodulator for PSK-modulated signals with a possibly time-varying carrier frequency is disclosed in U.S. Pat. No. 4,827,488, issued to Shibano. The time average of the frequency of an arriving signal is computed and taken as the present value $f_c$ of the carrier frequency. A mixer then mixes the arriving signal with the output signal from a variable frequency local oscillator with frequency $f_c$ to produce a square wave output signal that is used to reconstruct the data modulated onto the carrier wave. A pulse counter counts pulses in the square wave over a selected time interval and subtracts this number from a reference count number. The subtractor output signal is converted to an analog signal that controls the local oscillator frequency $f_c$.

U.S. Pat. No. 5,206,500, issued to Decker et al, discloses a pulsed laser detection system with noise averaging. A photodetector ($\phi$d) output signal is converted into (1) a first electrical signal with increased pulse width relative to the $\phi$d output signal and into (2) a second signal representing the time average of noise in the $\phi$d output signal. A third signal is formed that varies linearly with the difference of the first and second signals. A first comparator circuit compares the difference between the magnitude of the first signal and the third signal and generates a first comparator output signal. A second comparator circuit compares the difference between the magnitude of the $\phi$d output signal and the magnitude of the third signal and generates a second comparator output signal. If the first comparator output signal exceeds a first selected threshold and the second comparator output signal does not exceed a second selected threshold, the system determines that a (laser) pulse is present.

Lippel, in U.S. Pat. No. 5,253,045, discloses a television imaging system that interpolates finer intensity levels in critical areas of a dither-quantized television picture that is transmitted or received with relatively few intensity levels. In one embodiment, time averages over several consecutive frames of pixel regions that are not changing much with time are substituted for the present images on these pixel regions. Switching between these time-averaged image regions and the present images in these image regions is available.

An analyzer for a multi-cylinder engine that forms time averages of time intervals between firings of each cylinder and firings of the next consecutive cylinder is disclosed in U.S. Pat. No. 5,258,753, issued to Jonker et al. The fractional differences of these cylinder-to-cylinder intervals are computed, displayed and used to analyze engine performance.

In U.S. Pat. No. 5,291,284, issued to Carr et al, a predictive coding/decoding scheme with error drift reduction is disclosed. The tendency of long-term or time-averaged bias error to accumulate is reduced by periodically reversing the polarity of the estimated bias error relative to the estimate of the desired signal.

Signal differences that arise in a Global Positioning System (GPS) have been analyzed and used by a few workers. In U.S. Pat. No. 5,220,509, Takemura et al disclose a vehicle navigation system that uses GPS signals and signals from another self-contained navigation system (SCNS), such as a geomagnetic sensor. If the magnitude of the difference between a GPS-determined variable, such as bearing, and the corresponding SCNS-determined variable is greater than a selected threshold value, the SCNS value is corrected, using the GPS value. SCNS-determined navigation information is used exclusively when vehicle velocity is below a selected threshold (about 10 km/hour), where GPS navigation information is likely to be less accurate for a moving vehicle.

The signal differences formed and analyzed in the patents discussed above do not focus on the effects of differences in signals formed by two ostensibly identical signal receivers or on the effects of differences in processing of signals containing the same information. What is needed is a procedure that can be used to compensate for the differences in the corresponding filtered signals produced by two receiver/processors that perform the same functions. Preferably, the procedure should not depend strongly upon whether the receiver/processors are the same model or different models or upon whether the receiver/processors are manufactured by the same or different manufacturers. Preferably, the procedure should be flexible enough to take account of subsequent changes in the character of the incoming signals. Preferably, the procedure should take account of the possibility that two signals with similar information content can be processed differently by two receiver/processors to produce quantitative values for the same variables of interest.

SUMMARY OF THE INVENTION

These needs are met by the invention, which provides a procedure for compensating for differences in processed signals produced by any two equivalent receiver/processors that contemporaneously receive and process signals at the same site from two or more satellites or other signal sources. In one embodiment, the procedure begins by selecting one receiver/processor $R_1$ as a baseline. Given a second equivalent receiver/processor $R_2$ for which compensation is desired, a single difference signal $SD(t;R_1;S_1;S_2)=S(t;R_1;S_1)-S(t;R_1;S_2)$ is first formed from the signals $S(t;R_1;S_i)$ (i=1, 2) received at a single receiver $R_1$ from two specified satellites, numbered $S_1$ and $S_2$. Two operational GPS satellites will each transmit a distinct pseudorandom number (PRN) code or signal so that the single difference signal SD will depend strongly on the satellite number $S_i$.

A double difference signal $DD(t;R_1;R_2;S_1;S_2)=SD(t;R_1;S_1;S_2)-SD(t;R_2;S_1;S_2)$ is then formed, consisting of differences of the single difference signals $SD(t;R;S_1;S_2)$ for two specified receivers, numbered $R=R_1$ and $R=R_2$, at the same site. A time-averaged value $DD(R_1;R_2;S_1;S_2)_{avg}$ of this double difference value is formed and is used to compensate for the receiver/processor $R_2$ relative to the receiver/processor $R_1$, when signals are received from the satellite signal sources $S_1$ and $S_2$. A compensated double difference signal $DDC(t;R_1;R_2;S_1;S_2)=DD(t;R_1;R_2;S_1;S_2)-DD(R_1;R_2;S_1;S_2)_{avg}$ is formed whose long term time average is zero or has a magnitude below a selected threshold, as desired. Where compensation is required for two equivalent receiver/processors $R_2$ and $R_3$ receiving signals from two signal sources $S_2$ and $S_3$ at the same site, the difference signal $DDC(t;R_1;R_2;S_2;S_3)-DDC(t;R_1;R_3;S_2;S_3)$ also has the desired long term time average.

Where two incoming satellite signals include different Satellite Positioning System (SATPS) codes (e.g., a first signal including P code and a second signal including C/A code), new compensated double difference signals may again be formed that have the desired long term averages. However, these new compensated double difference signals are now characterized by two additional indices, representing the codes associated with the two satellite signals.

DETAILED DESCRIPTION

Figure 1:
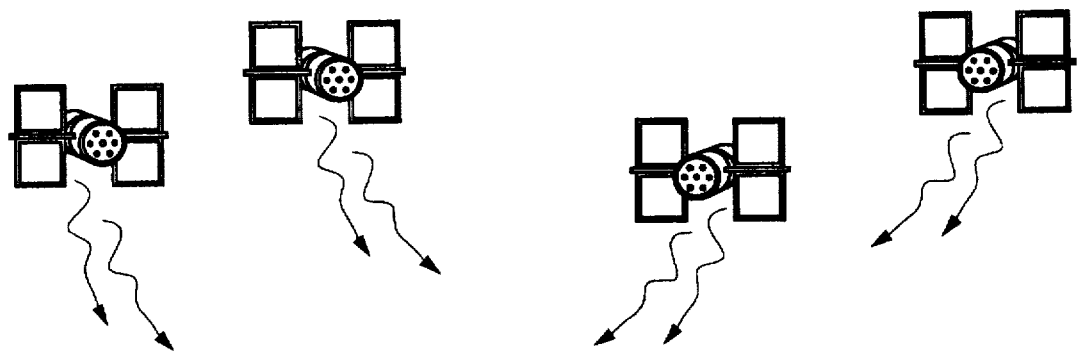
FIG. 1 is a perspective view illustrating testing of two equivalent receiver/processors to determine the compensation needed for processed signals produced by the received signals.
Figure 1:
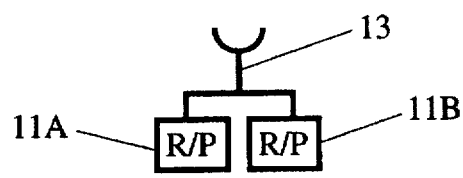

FIG. 1 illustrates a situation in which the invention is applied to two equivalent Satellite Positioning System (SATPS) receiver/processors 11A and 11B, present at the same site, that receive and process SATPS signals from the same SATPS satellites. An SATPS is discussed in detail below. Two receiver/processors (denoted "R/Ps" for convenient reference), such as 11A and 11B, are said to be "equivalent" if, when the two receiver/processors receive the same signal, each R/P produces a processed or output signal using the same active and inactive filters with the same nominal filter values for processing the incoming signals. The invention is not limited to satellite signals received and processed by SATPS R/Ps, but the invention will be initially described and illustrated with reference to satellite signal received in an SATPS system. In one testing mode, the two R/Ps 11A and 11B have a common antenna 13 that initially receives the satellite signals and is located at the same site. Use of a single antenna allows elimination of some common mode errors, such as multipath differences between a signal received by the two receivers. Alternatively, each R/P 11A and 11B may have its own antenna, and the two antennas can be placed side-by-side at the site.

This invention concerns biases that occur between processed signals produced by an SATPS signal antenna that feeds two equivalent R/Ps, numbered $R_1$ and $R_2$, located at the same site or different sites, from input signals received from one or two SATPS satellites, numbered $S_1$ and $S_2$. If an R/P, numbered R, receives an SATPS signal from an SATPS satellite, numbered SV, this received signal is represented by the signal values $S(t;R;SV)$. This signal, or the time required for the signal to propagate from the satellite to the R/P, may contain pseudorange or carrier phase information or other information used by the R/P to determine location coordinates of the R/P, the time of observation, the velocity coordinates for a moving R/P, or other quantities of interest. For a choice of two satellites, $S_1$ and $S_2$, and a common receiver $R_1$, a single difference signal $$SD(t;R_1;S_1;S_2) = S(t;R_1;S_1) - S(t;R_1;S_2) \quad (1)$$

is first formed. For a choice of two receivers, $R_1$ and $R_2$, a double difference signal $$DD(t;R1;R2;S_1;S_2) = SD(t;R_1;S_1;S_2) - SD(t;R_2;S_1;S_2) = S(t;R_1;S_1) - S(t;R_2;S_1) - S(t;R_1;S_2) + S(t;R_2;S_2) \quad (2)$$

is then formed, as a basic quantity for testing of and compensation for signal differences between two receiver/processors and two satellites. Generally, this double difference signal DD will not be identically zero. Preferably, this double difference signal DD will have a time varying amplitude with a very small maximum magnitude.

Figure 2:
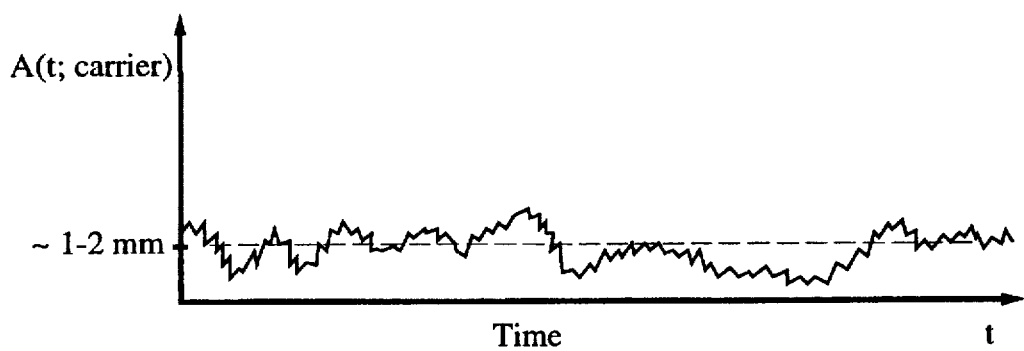
FIGS. 2 and 3 are graphical views of representative double difference signals for carrier phase and code phase signals, respectively, received and processed by two equivalent SATPS receiver/processors at the same site.
Figure 3:
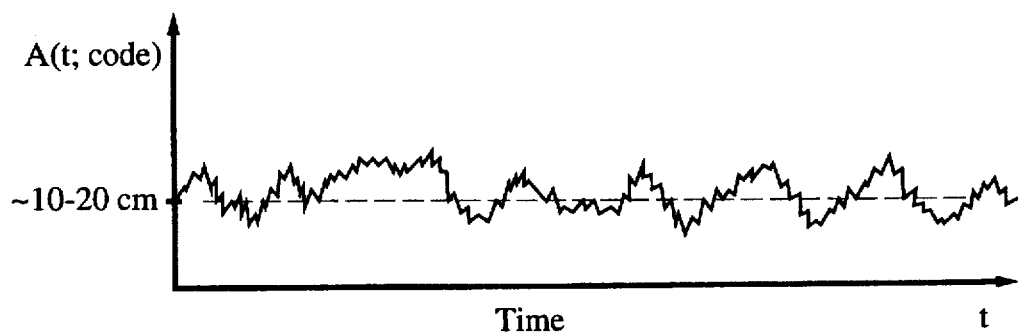

A carrier phase DD signal will typically undulate about a non-zero offset value, such as 1-2 mm, as time changes, with a typical maximum amplitude of +1 mm, when expressed in appropriate units, as illustrated in FIG. 2. A code phase DD signal will typically undulate about a non-zero offset value, such as 10-20 cm, with a ripple value of a few cm, as illustrated in FIG. 3. A carrier phase or code phase DD signal for two SATPS receiver/processors located at the same site should, ideally, have offset values of zero and have ripple values of no more than 1 mm and no more than 10 cm, respectively. The biases manifested by real life DD signals depend upon the pseudorandom number used for, or the binary code transmitted by, each of the two satellites and depend upon the two R/Ps used but do not depend upon any other controllable variable. If the two R/Ps are equivalent, the corresponding double difference signal DD should have a long term time average of zero.

Figure 4A:
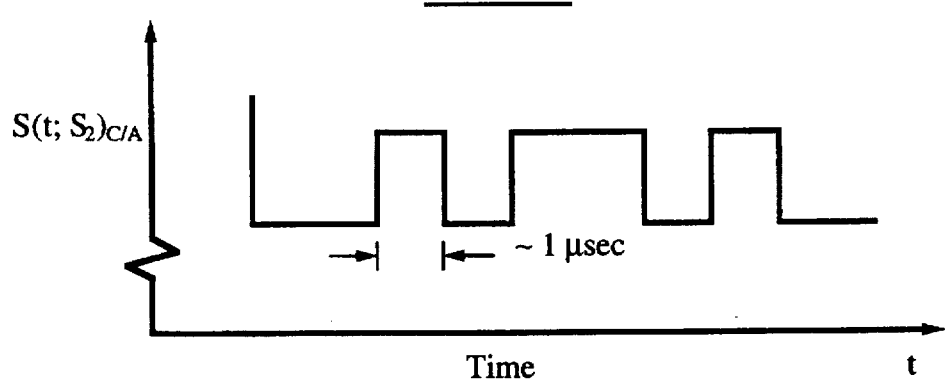
FIGS. 4A and 4B are graphical views of representative SATPS signals transmitted by two SATPS satellites with different PRN codes.
Figure 4B:
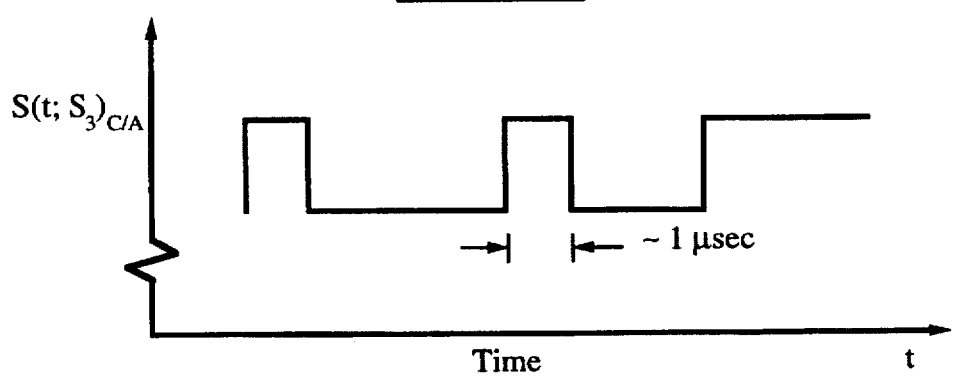

FIGS. 4A and 4B are graphs of variations with time t of representative SATPS C/A code signals transmitted by two distinct satellites. A Global Positioning System uses CDMA signals in which each satellite transmits a distinct binary pattern. If the satellite signal transmitted is a C/A code signal, the binary pattern has a frequency of 1.023 MHz and repeats every 1 msec, with a minimum pulse width of about 1 μsec. If the satellite signal transmitted is a P code signal, the binary pattern has a frequency of 10.23 MHz and repeats every 7.0 days. Thus, two C/A code signals, or a P code signal and a C/A code signal, transmitted from the same satellite, or from different satellites with different CDMA binary patterns, can have sharply different frequency spectra.

Figure 5A:
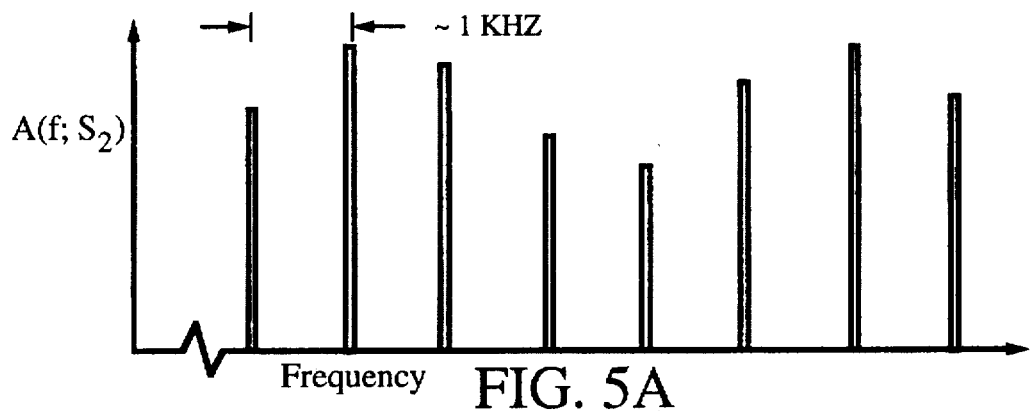
FIGS. 5A and 5B are graphical views of representative frequency spectra for the SATPS signals illustrated in FIGS. 4A and 4B, respectively.
Figure 5B:
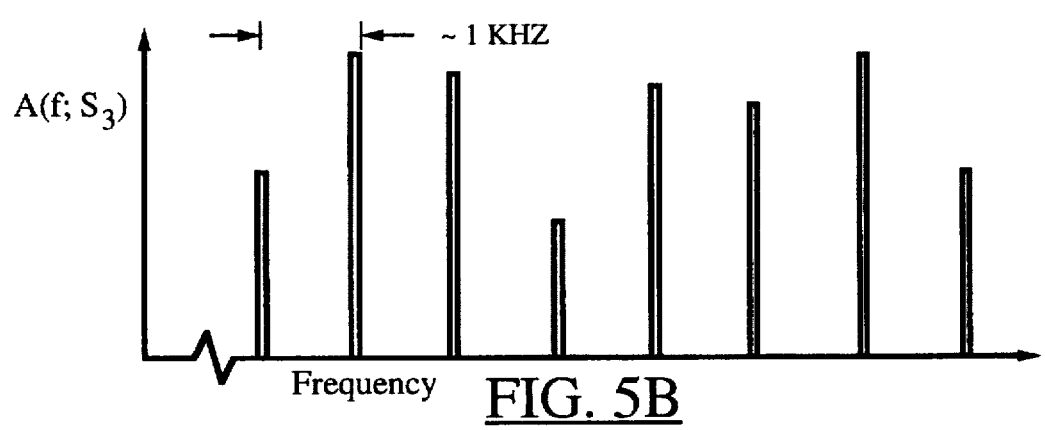

The C/A code spectra corresponding to the two CDMA signals in FIGS. 4A and 4B are illustrated in FIGS. 5A and 5B, respectively. The code spectra can be obtained from the time-varying signals in FIGS. 4A and 4B by Fourier transformation of these time-varying signals, in a manner well known to those of ordinary skill in the art. A large variation in amplitude appears in the spectral lines of the processed signal, with differences of 6-7 dB between minimum and maximum amplitudes being typical for a single spectrum. Note that the signal transmitted by each satellite has a distinct spectrum.

Figure 6A:
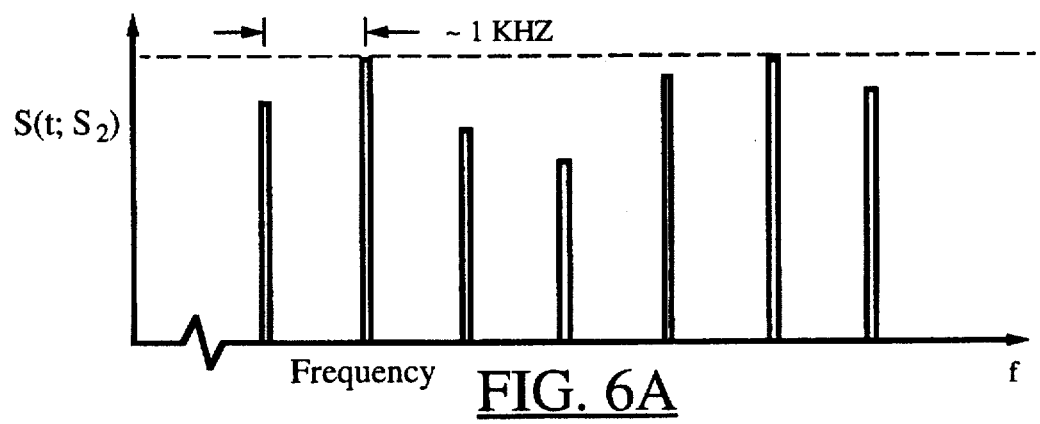
FIGS. 6A and 6B are graphical views of representative frequency spectra for two SATPS signals with the same PRN of CDMA code but assembled by different manufacturers.
Figure 6B:
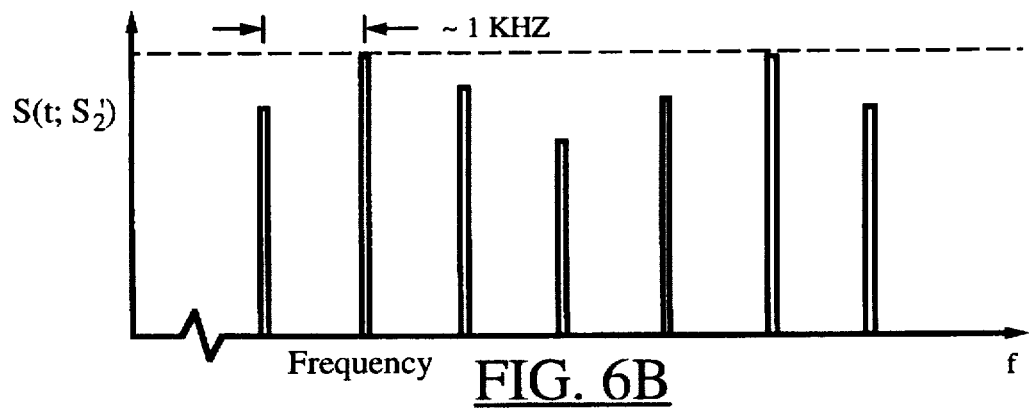

Assume that the satellite that produces the time-varying signal and spectrum in FIGS. 4B and 5B is replaced by a satellite (denoted SV2') with the same CDMA signal but built by a different manufacturer. The frequency spectra for the signals transmitted by the satellites SV2 and SV2' may differ slightly from each other, as illustrated in FIGS. 6A and 6B, because each manufacturer uses somewhat different active and inactive filter components and assembles the filters slightly differently. These filter component differences can produce differences at a band center, differences in bandwidth and amplitude fall-off, as well as other differences, for the signals transmitted by the two satellites having the same PRN code but being assembled by different manufacturers.

Each SATPS satellite can independently transmit signals in its normal mode, where the P code issues unchanged from the satellite transmitter, or in an anti-spoofing (AS) mode, where the P code is encrypted as Y code or as some other encrypted or semi-encrypted version, such as signal squaring, enhanced squaring, cross-correlation, or the "Z code" approach promoted by Ashtech of Sunnyvale, Calif. These encrypted versions of the P code signal are collectively referred to here as "Y code" for convenient reference. A P code signal is modulated on the L1 and the L2 channels, corresponding to carrier frequencies of approximately 1.575 GHz and 1.227 GHz, respectively. Table 1 sets forth the effect of the presence or absence of AS and the effect of choice of code (C/A or P) on the signal received by an R/P. A C/A code signal is modulated only on the L1 carrier signal and is not affected by the presence or absence of AS. Imposition of AS on the L2 channel forces the R/P to use cross-correlation processing of a received signal that would otherwise be processed as a P code signal.

Table 1. Effect of AS on C/A and P Code Signals Received at an R/P.

TABLE 1

Effect of AS on C/A and P Code Signals Received at an R/P.

| Code | Carrier | AS Inactive | AS Active |
|------|---------|-------------|-----------|
| C/A  | L1      | C/A         | C/A       |
| P    | L1      | P           | Switches to C/A code |
| P    | L2      | P           | Requires cross-correlation processing (C-C) |

Figure 7:
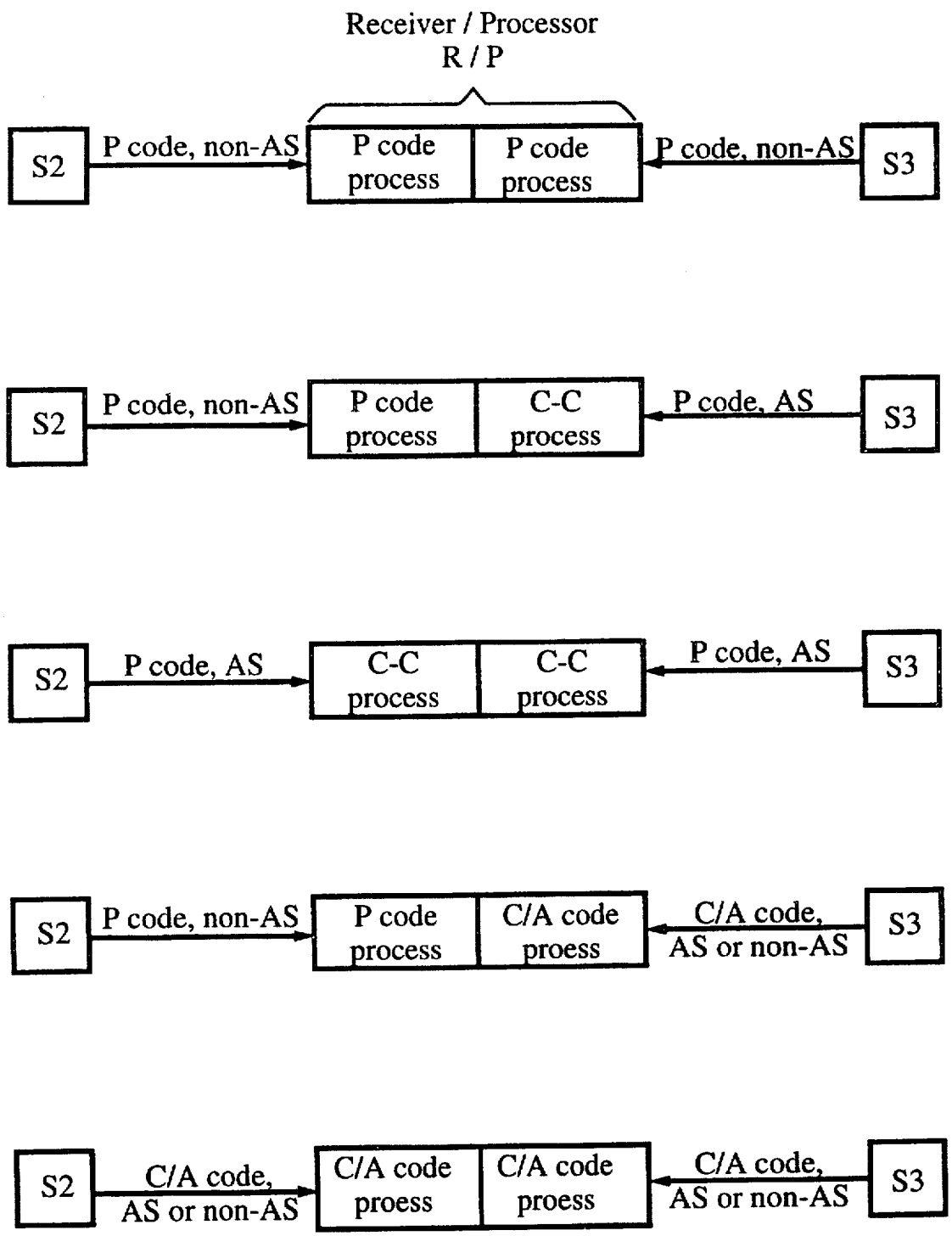
FIG. 7 schematically illustrates processing of C/A and P code signals at a receiver/processor in the absence and presence of anti-spoofing.

A signal received at a given R/P may thus have any one of three different kinds of code characteristics or "modes", namely C/A, P or C-C, and each kind of signal modes requires different filtering and processing to produce estimates of pseudorange signals or carrier phase signals. Here, C-C represents any form of signal processing that differs from the standard C/A code and P code processing. FIG. 7 illustrates the combined effects of receipt of C/A code and P code on the L1 and L2 channels, in the absence and presence of AS.

Figure 8:
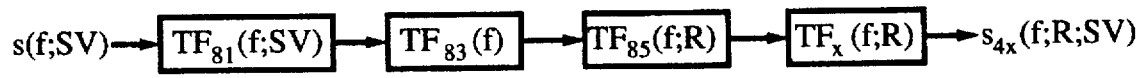
FIG. 8 is a schematic view illustrating the sequential effects of frequency plane transfer functions corresponding to (i) pre-transmission signal filtering in an SATPS satellite, (ii) signal variation due to propagation through the atmosphere, (iii) signal filtering in an SATPS receiver/processor and (iv) signal processing to produce the desired measurements (e.g., pseudorange signals or carrier phase signals).

FIG. 8 is a schematic view of various transfer function effects in the frequency domain on a signal S(f;SV) originally formed in an SATPS satellite, numbered SV, where f denotes temporal frequency. If a perfect or otherwise undistorted signal from a satellite, numbered SV, is represented in the frequency plane as s(f;SV), the signal actually transmitted from this satellite is expressible as $$s_1(f;SV) = TF_{s1}(f;SV) \, s(f;SV), \quad (3)$$

where $TF_{s1}(f;SV)$ is the transfer function that describes how the satellite actually filters or otherwise distorts the "pristine" signal s(f;SV). The signal $s_1(f;SV)$ is acted upon by a second transfer function $TF_{s3}(f)$, representing the effects of an signal propagation through an atmospheric module 83, to produce a second frequency domain signal $$s_2(f;SV) = TF_{s3}(f) \, TF_{s1}(f;SV) \, s(f;SV). \quad (4)$$

If the effects of atmospheric propagation are ignored, the second transfer function $TF_{s3}(f)$ can be replaced by the identity function 1.

Measurement by a particular manufacturer's R/P (identified by the number R) of the code phase and carrier phase signals can be further modelled using a transfer function $TF_{s5}(f;R)$ that represents the effects of signal filtering and distortion in the R/P, viz.

$$s_3(f;R;SV) = TF_{s5}(f;R) \, TF_{s3}(f) \, TF_{s1}(f;SV) \, s(f;SV). \quad (5)$$

At this point in the procedure, a distinction is made between processing a code phase signal and a carrier phase signal received by the R/P. Processing of a code phase signal and of a carrier phase signal by the R/P are represented by the respective transfer functions $TF_{code}(f;R)$ and $TF_{carrier}(f;R)$. The frequency plane representations of the fully processed code phase and carrier phase signals become, respectively, $$s_{4,code}(f;R;SV) = TF_{code}(f;R) \, TF_{s5}(f;R) \, TF_{s3}(f) \, TF_{s1}(f;SV) \, s(f;SV), \quad (6)$$

$$s_{4,carrier}(f;R;SV) = TF_{carrier}(f;R) \, TF_{s5}(f;R) \, TF_{s3}(f) \, TF_{s1}(f;SV) \, s(f;SV). \quad (7)$$

The transfer functions $TF_{s5}(f;R)$, $TF_{code}(f;R)$ and $TF_{carrier}(f;R)$ can be determined by the R/P manufacturer or other interested person, by testing and/or calibration at the factory or in the field. The satellite-dependent transfer function $TF_{s1}(f;SV)$ can be supplied by the satellite manufacturer, or can be obtained by measuring the satellite spectrum using a high gain antenna after the satellite is launched (or before launch, if available). An R/P manufacturer can, in principle, adjust the code phase and carrier phase transfer functions for an R/P to compensate for bias found in the transfer function $TF_{s1}(f;SV)$ of a particular satellite, by computing the differences between the ideal response and the expected real response in the frequency plane for the code phase and carrier phase signals. These differences $$\Delta s_{code}(f;R;SV) = s_{4,code,ideal}(f;R;SV) - s_{4,code}(f;R;SV), \quad (8)$$

$$\Delta s_{carrier}(f;R;SV) = s_{4,carrier,ideal}(f;R;SV) - s_{4,carrier}(f;R;SV), \quad (9)$$

can be used to additively compensate for the discrepancies between ideal and real responses.

It is also possible, in principle, to define a theoretically perfect R/P response, to be used for R/P calibration by an R/P manufacturer, that will assure compatibility between R/Ps made by the same manufacturer or by different manufacturers for a standardized signal s(f;SV) received by an R/P from a given satellite. This approach assumes that the satellite and the R/P introduce no filtering or distortion so that the respective idealized code phase and carrier phase frequency plane responses become $$s_{code,ideal}(f;R;SV) = TF_{code,ideal}(f;R) \, s(f;SV), \quad (10)$$

$$s_{carrier,ideal}(f;R;SV) = TF_{carrier,ideal}(f;R) \, s(f;SV). \quad (11)$$

An R/P manufacturer can, in principle, compensate for differences in satellite response and differences in R/P response for code phase or carrier phase signals, using Eqs. (6) and (7).

The inverse Fourier transforms of Eqs. (6) and (7) would be formed to produce the time-dependent pseudorange or carrier phase output signal produced by the R/P and would be used to determine other quantities, such as spatial location coordinates, clock offset, velocity coordinates and the like. Equations (6) and (7) illustrate formally the effects of the choice of satellite (number SV) and R/P (number R) on the output signal from the R/P. Choice of a different satellite number SV and/or of a different R/P number R can and will produce a different result. Further, use of a satellite bearing the same number SV, and hence transmitting the same PRN or CDMA code, but built by a different satellite manufacturer, may produce a slightly different first transfer function $TF_{s1}(f;SV)$, and hence a slightly different frequency domain signal $s_{4,code}(f;R;SV)$ or $s_{4,carrier}(f;R;SV)$ in Eqs. (6) and (7).

The signal differences manifested in Eq. (6) and in Eq. (7) can occur between any pair of SATPS R/Ps and any pair of satellites. The invention determines these differences for any given pair of receivers and (re)calibrates the R/Ps so that the associated DD signal biases are either zero or fall below an acceptable threshold.

Figure 9:
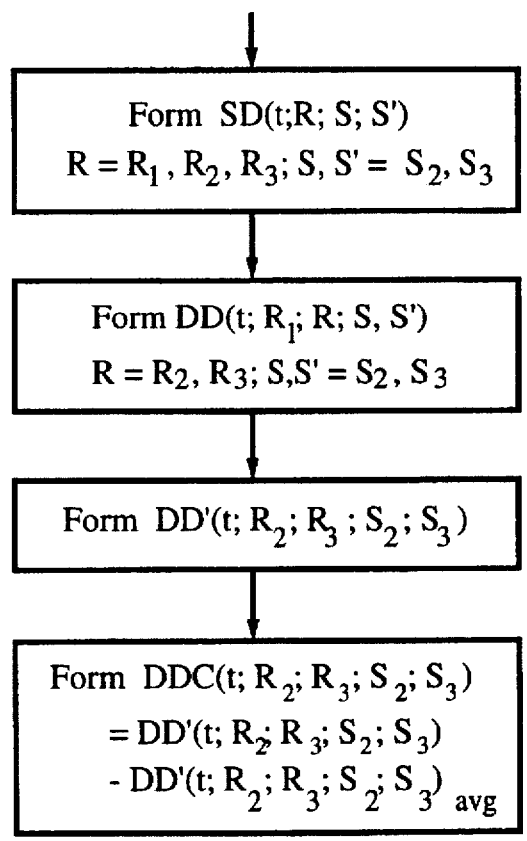
FIGS. 9 and 10 are flow charts illustrating suitable receiver/processor recalibration procedures according to the invention.

One suitable (re)calibration procedure for an R/P is performed as illustrated in FIG. 9. Receiver/processor number $R_1$ is chosen as a baseline. Single difference (SD) signals for this single receiver $R_1$ and two distinct satellites, numbered S2 and S3, are formed for a fixed choice of R/P number $R_1$. These SD signals are monitored for a time interval of a selected length T in the range 120 sec $\leq T \leq$ 1800 sec, to accurately estimate a mean value for each SD signal for each R/P number i, namely $$SD(R_1;S_2;S_3)_{avg} = \int_0 SD(t;R_1;S_2;S_3) dt/T \quad (12)$$

for each distinct satellite pair (S2;S3) and for each receiver $R_1$, at a fixed site. Time averages of double difference signals. Time averages of double difference signals $$DD(t;R_1;R_2;S_2;S_3) = SD(t;R_1;S_2;S_3)_{avg} - SD(t;R_2;S_2;S_3)_{avg}, \quad (13)$$

$$DD(t;R1;R1;S2;S3) = 0. \quad (14)$$

are then formed, using the baseline R/P $R_1$ and another R/P, numbered $R_2$. A lookup table is created for calibration of each R/P $R_2$ against the baseline R/P $R_1$ and is optionally included with the software or firmware for R/P $R_2$. Calibration of double differenced signals, using two different R/Ps at the same site, is performed by differencing of the corresponding lookup table values for these two R/Ps, viz $$DD'(t;R_2;R_3;S_2;S_3) = DD(R_1;R_2;S_2;S_3) - DD(R_1;R_3;S_2;S_3). \quad (15)$$

One then forms the compensated signal $$DDC(t;R_2;R_3;S_2;S_3)=DD'(t;R_2;R_3;S_2;S_3)-DD'(R_2;R_3;S_2;S_3)_{avg}. \quad (16)$$

Ideally, this produces compensated double difference signals for which the magnitude of the long term time average either vanishes or lies below a selected small threshold, where the two R/Ps $R_2$ and $R_3$ are located at the same site.

The DD values for the $(R_2;R_3;S_2;S_3)$ receiver/processor-satellite combination in Eq. (15) could be formed using the alternative relations $$DD'(t;R_2;R_3;S_2;S_3)=DD(R_1;R_2;S_1;S_2)-DD(R_1;R_3;S_1;S_3) \quad (15')$$

if the spectra of the corresponding signals transmitted by the satellites $S_1$, $S_2$ and $S_3$ are substantially identical. Because this circumstance is usually not present, Eq. (15) is preferred over Eq. (15') for computation of the time averaged DD values for the $(R_2;R_3;S_2;S_3)$ receiver/processor-satellite combination.

For convenient reference, let $M_2$ and $M_3$ denote the respective modes of the signals transmitted by the satellites $S_2$ and $S_3$. As noted above in connection with Table 1, if each of the two satellites $S_2$ and $S_3$ transmits the same mode signal (C/A with AS inactive or active, P with AS inactive, C-C), these two signals will be processed in the same manner by one R/P or by each of two R/Ps.

However, signal processing of mode $M_2$ and $M_3$ signals transmitted by the respective satellite $S_2$ and $S_3$, where $M_2$ and $M_3$ are different modes, will produce different DD signals for any two R/Ps $R_2$ and $R_3$. The SATPS signal transmitted by a given satellite is, therefore, characterized by a double index: (1) a first index SV representing the satellite number or PRN code for that satellite; and (2) a second index M representing one of the two or more modes of the signal that can be used for the satellite signal transmission: M=1 (C/A with AS inactive or active, M=2 (P with AS inactive), and M=3 (C-C) for the signal received by a given R/P. Where signal mode differences are to be taken into account, Eqs. (12)), (13), (14), (15) and (16) are replaced by the more comprehensive relations $$SD(R_1;S_2;M_2;S_3;M_3)_{avg}=\int_0^T SD(t;R_1;S_2;M_2;S_3;M_3)dt/T, \quad (17)$$

$$DD(t;R_1;R_2;S_2;M_2;S_3;M_3)=SD(R_1;S_2;M_2;S_3;M_3)-SD(R_2;S_2;M_2;S_3;M_3), \quad (18)$$

$$DD(t;R_1;S_2;M;S_3;M)_{avg}=0 \ (M=M_2 \text{ or } M_3), \quad (19)$$

$$DD'(t;R_2;R_3;S_2;M_2;S_3;M_3)=DD(t;R_1;R_2;S_2;M_2;S_3;M_3)-DD(t;R_1;R_3;S_2;M_2;S_3;M_3), \quad (20)$$

$$DDC(t;R_2;R_3;S_2;M_2;S_3;M_3)=DD'(t;R_2;R_3;S_2;M_2;S_3;M_3)-DD'(R_2;R_3;S_2;M_2;S_3;M_3)_{avg}, \quad (21)$$

where each of the mode indices $M_2$ and $M_3$ can independently assume the three parameter values set forth above.

Figure 10:
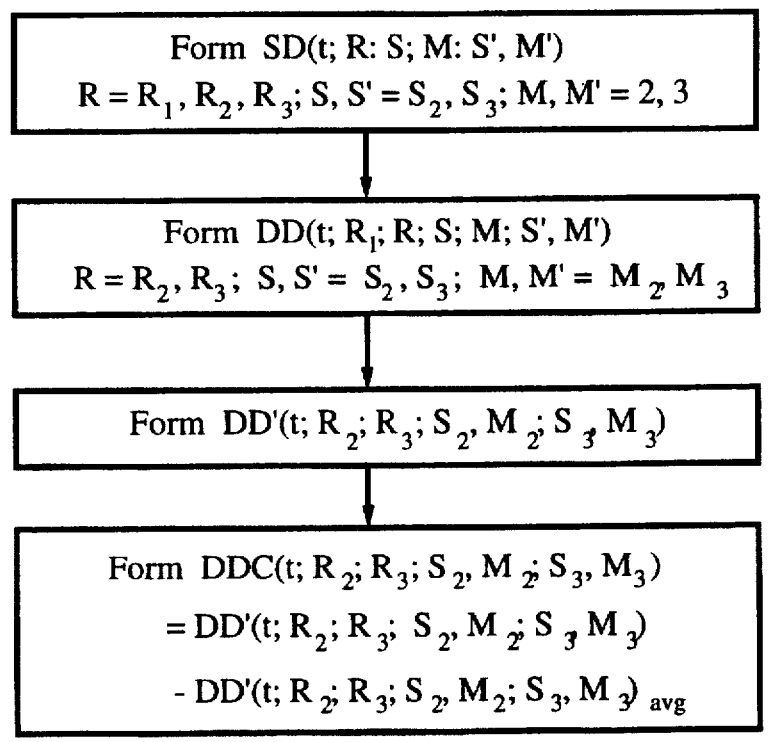

The quantities $SD(R_1;S_1;M_1;S_2;M_2)_{avg}$ in Eq. (17) are measured by time averaging for each of the 9 permutations of the mode index ordered pairs $(M_1,M_3)$, and these 9 measured quantities SD are used in appropriate combinations to produce the DDC values set forth in Eq. (21). The mode indices $M_2$ and/or $M_3$ for a respective satellite $S_2$ or $S_3$ may change from time to time, and the corresponding compensated double difference quantity DDC in Eq. (21) must be changed at the same time the mode index $M_2$ or $M_3$ changes. A (re)calibration procedure for signal processing of two signals, which may have the same mode or different modes, received by two receiver/processors at the same site, is set forth in FIG. 10.

Equations (17)–(21) easily extend to a situation where each of two receiver/processors receives two satellite signals and each of these signals can be any of N modes ($N \geq 2$). In this instance, Eqs. (17)–(21) remain formally unchanged, but the mode index M for each of the two signals is now numbered M=1, 2, ..., N, and $N^2$ different Eqs. (16) must be formed for the mode index ordered pair $(M_2,M_3)$.

Figure 11A:
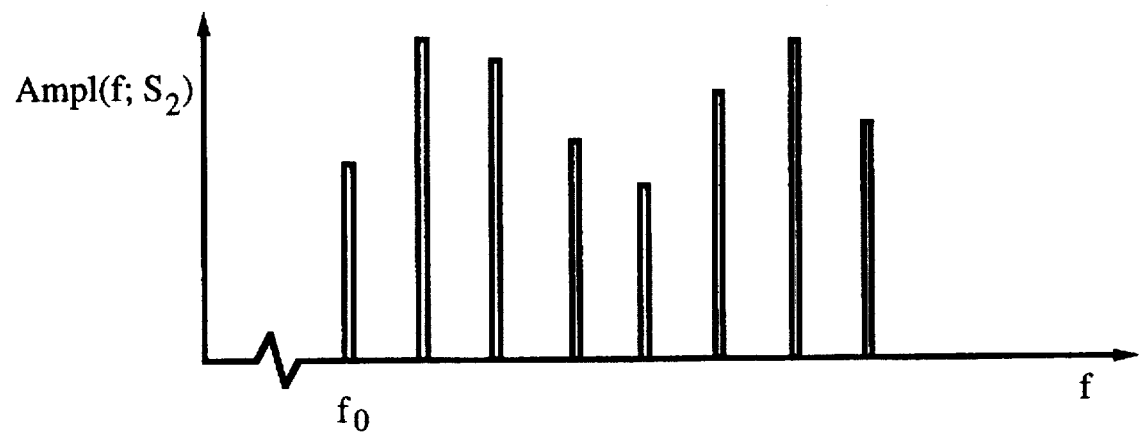
FIGS. 11A and 11B illustrate frequency response differences between two spaced apart receiver/processors due to differences in Doppler shifting and receiver clock frequency offsets.
Figure 11B:
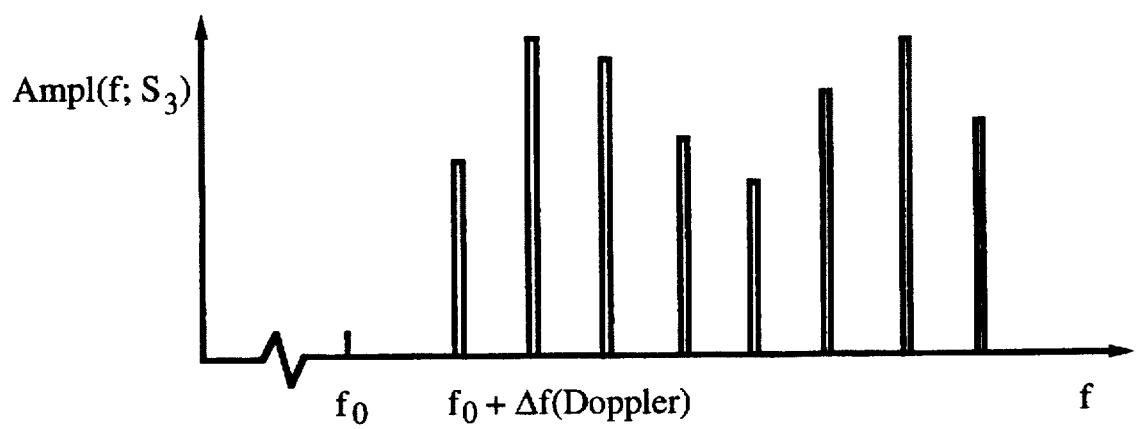

One other difference can occur, between the carrier phase measurements produced by two R/Ps located at different sites and/or moving relative to each other. Each R/P will receive somewhat different Doppler-shifted carrier phase signals from a given satellite at a given time, because each RIP is in a different location relative to the moving satellite. This produces somewhat different frequency-dependent filter envelopes for the two signals. FIGS. 11A and 11B illustrate respective representative filter envelopes, as functions of frequency, in the absence of Doppler shift and receiver clock frequency offset, and in the presence of Doppler shift and receiver clock frequency offset, resulting from receipt of satellite signals by two receivers, $R_2$ and $R_3$, located at different sites and/or moving relative to each other. The Doppler shifts of signals received at the two R/Ps produce somewhat different frequency plane pre-processing frequency response functions $s_3(f;R;SV)$, defined in Eq. (5), and hence different total frequency response functions $S_{carrier}(f;R;SV)$. These differences are substantial where C/A code, with relatively large spectral line spacing, is used in signal processing. The envelope shown in FIG. 11B is shifted by an amount $\Delta f$ from the envelope shown in FIG. 11A. In some instances, an additive term proportional to frequency can also appear as part of the difference between the envelopes in FIGS. 11A and 11B.

The time-averaged double difference R/P signals in Eqs. (12)) or (17) may also depend upon other variables, such as temperature, humidity and elevation at the site. These variables can also be compensated for by appropriate multi-variable modeling.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7,000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, ..., 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few milliimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit, pp. 17–90.

The invention has been discussed in the context of a Satellite Positioning System, such as GPS or GLONASS. However, the invention can be applied to any satellite-based system or ground based system in which two or more nominally identical signal receiver/processors each receive signals from two or more nominally identical signal transmitters. The single difference and double difference signals can be formed, and the long term averages computed and used to compensate for differences in the signal receiver/processors and/or in the signal transmitters.

I claim:

1. A method for compensation of a signal receiver with respect to another signal receiver, where each receiver receives electronic communication signals from at least two signal sources, that produces substantially equivalent data at each of the receivers, the method comprising the steps of:

receiving time varying first and second signals at a first receiver from a first signal source and from a second signal source, receiving time varying third and fourth signals at a second receiver from the first and second signal sources, respectively, and receiving time varying fifth and sixth signals at a third receiver from the first and second signal sources, respectively;

forming a first difference signal, equal to a sum of the first and fourth signals, minus a sum of the second and third signals;

forming a second difference signal, equal to a sum of the first and sixth signals, minus a sum of the second and fifth signals; and forming a compensated signal, for the first and second source signals and for second and third receivers that are not confined to the same site, that is a sum of the first difference signal and a time average of the second difference signal, minus a sum of the second difference signal and a time average of the first difference signal.

2. The method of claim 1, further comprising the step of calculating at least one of said time averages of said first and second difference signals using a time interval in the range $120 \text{ sec} \leq T \leq 1800 \text{ sec}$.

3. The method of claim 1, further comprising the step of allowing said first and second signal sources to have independently selected transmission modes for signals transmitted from said first and second signal sources.

4. A method for compensation of a signal receiver with respect to another signal receiver, where each receiver receives electronic communication signals from at least two signal sources, that produces substantially equivalent data at each of the receivers, the method comprising the steps of:

receiving time varying first and second signals at a first receiver from a first signal source and from a second signal source, and receiving time varying third and fourth signals at a second receiver from the first and second signal sources, respectively;

forming a difference signal, equal to a sum of the first and fourth signals, minus a sum of the second and third signals; and forming a compensated signal, for the first and second source signals and for second and third receivers that are not confined to the same site, that is a difference between the difference signal and a time average of the difference signal.

5. The method of claim 4, further comprising the step of calculating said time average of said difference signal using a time interval in the range $120 \text{ sec} \leq T \leq 1800 \text{ sec}$.

6. The method of claim 4, further comprising the step of allowing said first and second signal sources to have independently selected transmission modes for signals transmitted from said first and second signal sources.

7. A method for compensation of a signal receiver with respect to another signal receiver, where each receiver receives electronic communication signals from at least two signal sources, that produces substantially equivalent data at each of the receivers, the method comprising the steps of:

receiving time varying first and second signals at a first receiver from a first signal source and from a second signal source, receiving time varying third and fourth signals at a second receiver from the first and second signal sources, respectively, and receiving time varying fifth and sixth signals at a third receiver from the first and second signal sources, respectively;

forming a first difference signal, equal to a sum of the first signal and a time average of the second signal, minus a sum of the second signal and a time average of the first signal;

forming a second difference signal, equal to a sum of the third signal and a time average of the fourth signal, minus a sum of the fourth signal and a time average of the third signal;

forming a third difference signal, equal to a sum of the fifth signal and a time average of the sixth signal, minus a sum of the sixth signal and a time average of the fifth signal;

forming a fourth difference signal, equal to a difference between the first and second difference signals;

forming a fifth difference signal, equal to a difference between the first and third difference signals; and forming a compensated signal, for the first and second source signals and for second and third receivers that are not confined to the same site, equal to a difference between the fourth and fifth difference signals.

8. The method of claim 7, further comprising the step of calculating at least one of said time averages of said first, second, third, fourth, fifth and sixth signals using a time interval in the range $120 \text{ sec} \leq T \leq 1800 \text{ sec}$.

9. The method of claim 7, further comprising the step of allowing said first and second signal sources to have independently selected transmission modes for signals transmitted from said first and second signal sources.

10. A method for compensation of a signal receiver with respect to another signal receiver, where each receiver receives electronic communication signals from at least two signal sources, that produces substantially equivalent data at each of the receivers, the method comprising the steps of:

receiving time varying first and second signals at a first receiver from a first signal source and from a second signal source, and receiving time varying third and fourth signals at a second receiver from the first and second signal sources, respectively;

forming a first difference signal, equal to a sum of the first signal and a time average of the second signal, minus a sum of the second signal and a time average of the first signal;

forming a second difference signal, equal to a sum of the third signal and a time average of the fourth signal, minus a sum of the fourth signal and a time average of the third signal; and forming a compensated signal, for the first and second source signals and for first and second receivers that are not confined to the same site, equal to a difference between the first and second difference signals.

11. The method of claim 10, further comprising the step of calculating at least one of said time averages of said first, second, third and fourth signals using a time interval in the range $120 \text{ sec} \leq T \leq 1800 \text{ sec}$.

12. The method of claim 10, further comprising the step of allowing said first and second signal sources to have independently selected transmission modes for signals transmitted from said first and second signal sources.

13. A method for compensation of a signal receiver with respect to another signal receiver, where each receiver receives electronic communication signals from at least two signal sources, that produces substantially equivalent data at each of the receivers, the method comprising the steps of:

receiving time varying first and second signals at a first receiver from a first signal source that transmits in a first selected transmission mode and from a second signal source that transmits in a second selected transmission mode, and receiving time varying third and fourth signals at a second receiver from the first and second signal sources, respectively;

forming a difference signal, equal to a sum of the first and fourth signals, minus a sum of the second and third signals; and forming a compensated signal, for the first and second source signals and for second and third receivers that are not confined to the same site, that is a difference between the difference signal and a time average of the difference signal.

14. Apparatus for compensation of a signal receiver with respect to another signal receiver, where each receiver receives electronic communication signals from at least two signal sources, that produces substantially equivalent data at each of the receivers, the apparatus comprising:

a first signal receiver that receives time varying first and second information signals from first and second signal sources, respectively, and that transmits these signals;

a signal processor that receives the first and second signals from the first signal receiver, that receives time varying third and fourth signals that have been received by a second signal receiver from the respective first and second signal sources, and that receives time varying fifth and sixth signals that have been received by a third signal receiver from the respective first and second signal sources;

where the signal processor:
  (i) forms a first difference signal, equal to a sum of the first and fourth signals minus the sum of the second and third information signals;
  (ii) forms a second difference signal, equal to a sum of the first and sixth signals minus the sum of the second and fifth information signals; and
  (iii) forms a compensated signal, for the first and second source signals and for second and third receivers that are not confined to the same site, equal to a sum of the first difference signal and a time average of the second difference signal, minus a sum of the second difference signal and a time average of the first difference signal.

15. The apparatus of claim 14, wherein said time average is determined over a selected length of time T in the range 120 sec≦T≦1800 sec.

16. The apparatus of claim 14, wherein said first and second signal sources have independently selected transmission modes for transmission of signals from said first and second signal sources, respectively.

17. Apparatus for compensation of a signal receiver with respect to another signal receiver, where each receiver receives electronic communication signals from at least two signal sources, that produces substantially equivalent data at each of the receivers, the apparatus comprising:

a first signal receiver that receives time varying first and second information signals from first and second signal sources, respectively, and that transmits these signals;

a signal processor that receives the first and second signals from the first signal receiver, that receives time varying third and fourth signals that have been received by a second signal receiver from the respective first and second signal sources, and that receives time varying fifth and sixth signals that have been received by a third signal receiver from the respective first and second signal sources;

where the signal processor:
  (i) forms a first difference signal, equal to a sum of the first signal and a time average of the second signal, minus the sum of the second signal and a time average of the first signal;
  (ii) forms a second difference signal, equal to a sum of the third signal and a time average of the fourth signal, minus the sum of the fourth signal and a time average of the third signal;
  (iii) forms a third difference signal, equal to a sum of the fifth signal and a time average of the sixth signal, minus the sum of the sixth signal and a time average of the fifth signal;
  (iv) forms a fourth difference signal, equal to a difference between the first difference signal and the second difference signal;
  (v) forms a fifth difference signal, equal to a difference between the first difference signal and the third difference signal; and
  (iii) forms a compensated signal, for the first and second source signals and for second and third receivers that are not confined to the same site, equal to a difference between the fourth and fifth difference signals.

18. The apparatus of claim 17, wherein said time average is determined over a selected length of time T in the range 120 sec≦T≦1800 sec.

19. The apparatus of claim 17, wherein said first and second signal sources have independently selected transmission modes for transmission of signals from said first and second signal sources, respectively.

* * * * *